J., C. & T. BEACH, & W. G. R. MOWRY.
Preparing Flax, Hemp, &c., for Manufacturing Purposes.
No. 5,734. Patented Aug. 29, 1848.
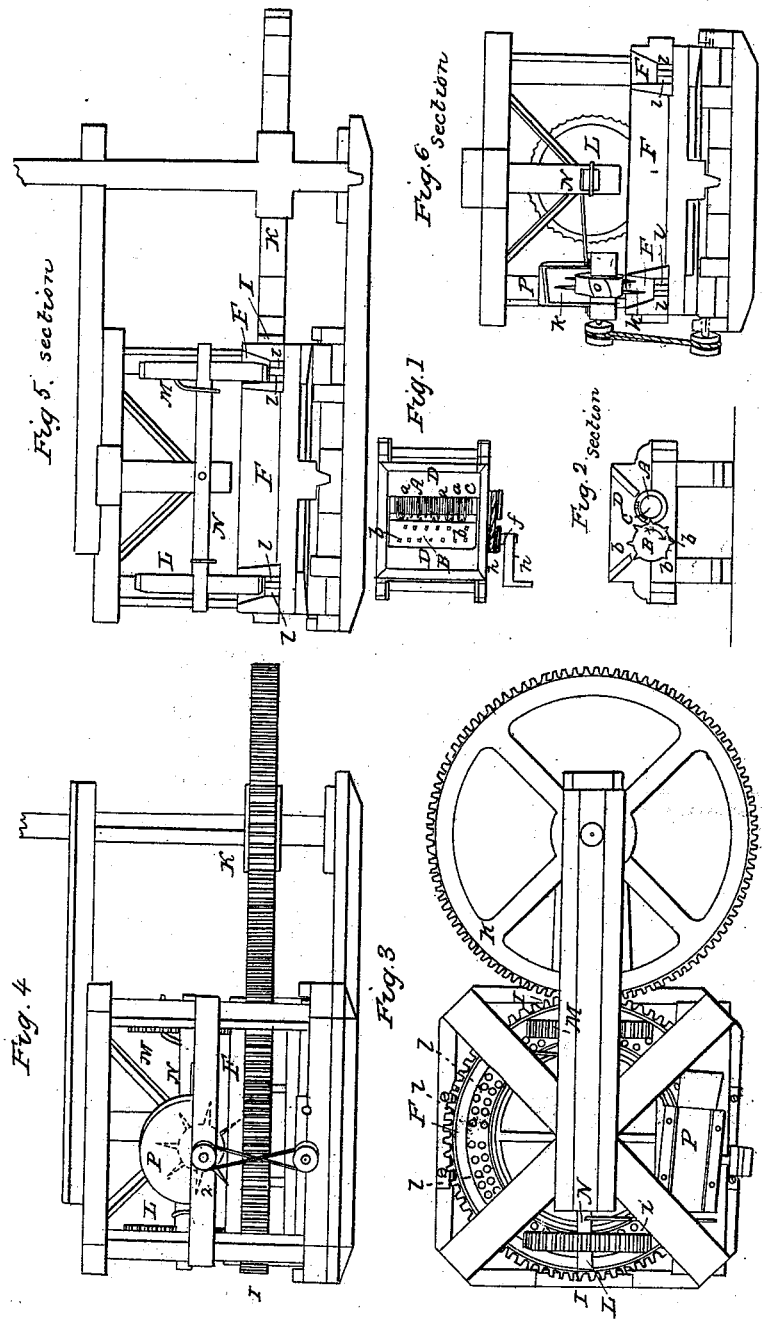

UNITED STATES PATENT OFFICE.

JOSEPH BEACH AND CHARLES BEACH, OF CANTON, CONN., THOMAS BEACH, OF SPRINGFIELD, MASS., AND WM. G. R. MOWRY, OF SMITHFIELD, R. I.

IMPROVEMENT IN MACHINERY FOR CUTTING AND PREPARING FLAX, &c., FOR CARDING.

Specification forming part of Letters Patent No. 5,734, dated August 29, 1848.

*To all whom it may concern:*

Be it known that we, JOSEPH BEACH and CHARLES BEACH, of Canton, in the State of Connecticut, THOMAS BEACH, of Springfield, in the State of Massachusetts, and WILLIAM G. R. MOWRY, of Smithfield, in the State of Rhode Island, have invented a new and useful improvement in a machine for preparing flax, hemp, or other analogous material of long fiber so as to be carded, spun, woven, and treated in other respects like cotton or wool; and we do hereby declare that the nature of our invention is fully set forth in the following description and accompanying drawings, letters, figures, and references thereof.

Figure 1 of the aforementioned drawings denotes a top view of a machine for cutting or separating the flax into short pieces. Fig. 2 is a vertical and central section of it, taken through the cylinder of knives, and the toothed cylinder adjacent to it, A being the former cylinder and B the latter. The first is composed of a series of similar circular knives, a a a, &c., arranged at equal distance apart upon a horizontal axis or shaft, C. The said series of knives are placed in contact, or nearly so, with the second cylinder, B, which is made of wood and covered with rawhide or other proper material, and has teeth or points b b, &c., projecting from its surface in ranges parallel to each other, the said teeth being made to pass between the knives when both cylinders are rotated on their axes in the direction as denoted by the arrows a and E in Fig. 2. Their movements may be effected by two pulleys, f g, fixed on their axes, respectively, and having a crossed band, h, applied to them. On applying the hand to a crank, n, affixed to one end of the pulleys and rotating the cylinder B, the other cylinder will be made to travel in an opposite direction. A hopper, D, is placed over the cylinders, as seen in the drawings. The material to be cut into short pieces is thrown into the hopper and carried into contact with the knives of the cylinder A by the points or teeth of the cylinder B, and as it passes between the two cylinders it is reduced or cut into the short pieces in the manner required. Fig. 3 is a top view of the rolling-mill in which the flax, after being cut into short lengths, is to be milled. Fig. 4 is a front elevation of the same. Fig. 5 is a vertical and transverse section of it. Fig. 6 is another vertical and transverse section taken through the breaker-wheels.

In said figure, F represents a large circular trough or wheel arranged horizontally and properly supported, set upon four beveled rollers, and so arranged as to be made to travel in or under a circular beveled cast-iron plate, as represented in the model. It is made to revolve by gears or teeth L, disposed upon its circumference, and engaging with a driving-wheel, K.

L M are two breakers or heavy vertical wheels placed in the trough and upon a fixed horizontal shaft, N, as seen in the drawings. The said wheels revolve upon the ends or journals of the shaft, the said shaft being so placed and secured as to allow the said wheels or breakers to rise and fall sufficient to travel upon the flax or other material when in operation.

O is a picker-wheel, which is placed in the trough F, and has points or arms K K extending from it, as seen by dotted lines in Fig. 4. The said wheel may be put in revolution by a cross-band running upon a pulley attached to one of the rollers running under the trough or horizontal wheel, as seen in the model.

P is a semicircular box or casing placed over the picker-wheel, for the purpose of preventing the flax from being thrown out of the machine.

The object of the picker-wheel is to loosen up the mass of flax after the breaker-wheels have rolled over it and preparatory to their again rolling over it during a second revolution of the trough. The bottom of the trough is pierced with numerous holes, Z Z, &c., to admit the escape of dust and other extraneous matter broken or separated from the flax. The circumference of the breaker-wheels is to be fluted or indented to more readily break down the flax as it passes under them.

Our process or method of preparing flax, hemp, and other material of long fiber may be set forth as follows: First, the flax or other material is taken while in the straw and in an undressed state, and is thrown into the hopper D, which is placed over the cylinders A and B, reference being had to the specification and drawings, and by giving motion to the cylinders A and B the flax or other material is carried by the points or teeth *b b b*, projecting from cylinders B into contact with the knives on cylinder A, and is cut transversely, or across its long fiber, by passing between the two cylinders A and B, thus reducing said flax, hemp, or other material into short pieces from two to four inches in length, or the same length as the knives are set apart on the cylinder A; and, second, the flax, hemp, or other material of long fiber, having been cut into short pieces, is thrown into the rotating trough E. The said trough is then rotated. Thus the flax or other material intended to be milled is carried round and under the breaker-wheels L M, thereby milling and pulverizing and separating the shives or woody parts from the hurd, and also the dust and other extraneous matter usually adhering to them, and also separating the fibers from one another. Thus we continue the operation of the mill until the material that is submitted to its action is reduced to that state of fineness and softness suited to the purpose for which it is designed, then it may be removed from the trough; and the mill is ready for a second operation.

What we claim as our invention, and wish to secure by Letters Patent, is—

1. The construction and combination of machinery, as set forth in specification and drawings, as applied to cutting and dressing flax, hemp, and other analogous material of long fibers, the application of said machinery to the cutting and milling of flax, hemp, &c., for the purpose of dressing and preparing it to be worked in machinery similar to that in which cotton is worked, to be a new and useful improvement.

2. We do not claim cutting flax into short pieces as new, as we are aware it has been the practice of cutting the flax into short pieces in Great Britain and France for many years; but we do claim our peculiar method and process of cutting and dressing flax, hemp, and other material of long fiber to be new. We do therefore desire and petition that Letters Patent may be granted securing to us the construction and combination of machinery, as set forth in the specification and drawings in this application, to cutting and dressing flax, hemp, and other analogous material of long fiber, and our peculiar process of preparing flax, hemp, &c., so as that it can be worked substantially in the same manner as cotton is worked.

3. The construction and combination of machinery as set forth in the above specification and drawings, as applied to dressing and cutting flax, hemp, and other analogous material of long fiber, and our peculiar process.

JOSEPH BEACH.
CHARLES BEACH.
THOMAS BEACH.
WM. G. R. MOWRY.

Witnesses:
TURNER THAYER,
JOHN G. JOHNSON.